United States Patent [19]
Hashimoto et al.

[11] 3,799,988
[45] Mar. 26, 1974

[54] ω-GUANIDINO ACID DIAMIDE DERIVATIVES AND MANUFACTURING THE SAME

[75] Inventors: Sadao Hashimoto, Itano-gun; Katsushi Okada; Ryuji Sakakibara, both of Naruto; Setsuro Fujii, Tokushima, all of Japan

[73] Assignee: Taiho Pharmaceutical Company Limited, Tokyo, Japan

[22] Filed: Apr. 2, 1970

[21] Appl. No.: 25,240

[30] Foreign Application Priority Data
Apr. 2, 1969 Japan................................ 44-25806

[52] U.S. Cl...... 260/561 A, 260/501.14, 260/562 N, 260/999
[51] Int. Cl............................................. C07c 103/50
[58] Field of Search........ 260/501.14, 561 A, 562 N

[56] References Cited
OTHER PUBLICATIONS

Hafner et al. J. Am. Chem. Soc. Vol. 79, pgs. 3,783–3,786 (1957)
Fujii, Chemical Abstracts, Vol. 71, 49602c (1969)
Horlicks Ltd., Chemical Abstracts, Vol. 71, 80752a (1969)

*Primary Examiner*—Leon Zitver
*Assistant Examiner*—Michael W. Glynn
*Attorney, Agent, or Firm*—Larson, Taylor and Hinds

[57] ABSTRACT

The present ω-guanidino acid diamide derivatives are new compounds having a structural formula of

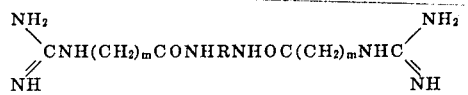

wherein $m$ is an integer of 1 to 10 and R is an alkylene of one to 12 carbon atoms or

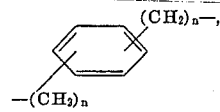

$n$ being 0 or an integer of 1 to 3. The above derivatives and onium salts thereof are excellent in pharmacological activity, particularly in antagonism to bradykinin and inhibition of edema, and thus useful as anti-inflammatory agent.

8 Claims, No Drawings

ω-GUANIDINO ACID DIAMIDE DERIVATIVES AND MANUFACTURING THE SAME

This invention relates to new and useful ω-guanidino acid diamide derivatives and onium salts thereof having high order of pharmacological activity and to a process for manufacturing them.

The ω-guanidino acid diamide derivatives of the invention are of the following formula:

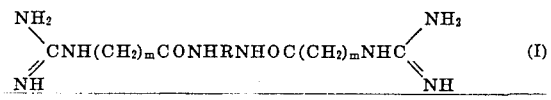
(I)

Wherein $m$ is an integer of 1 to 10 and R is an alkylene of one to 12 carbon atoms or

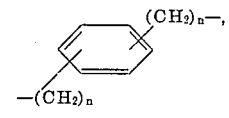

$n$ being 0 or an integer of 1 to 3.

The present diamide derivatives having the above formula (I) and onium salts thereof are excellent in pharmacological activity, particularly in antagonism to bradykinin and inhibition of edema, and thus useful as anti-inflamatory agent.

The representative examples of the amide derivatives of the invention are listed in the Table 1 below, in which the melting points show those of the acetic acid salts of the respective compounds.

TABLE 1

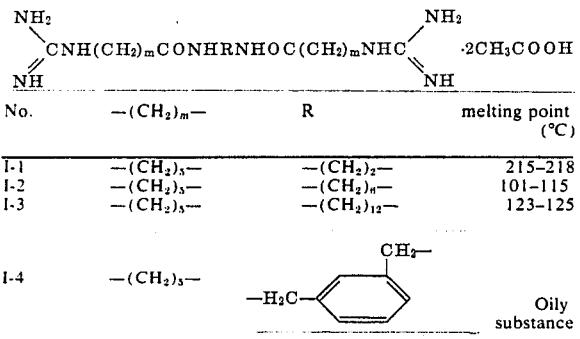

| No. | —(CH$_2$)$_m$— | R | melting point (°C) |
|---|---|---|---|
| I-1 | —(CH$_2$)$_5$— | —(CH$_2$)$_2$— | 215–218 |
| I-2 | —(CH$_2$)$_5$— | —(CH$_2$)$_6$— | 101–115 |
| I-3 | —(CH$_2$)$_5$— | —(CH$_2$)$_{12}$— | 123–125 |
| I-4 | —(CH$_2$)$_5$— | —H$_2$C—⌬—CH$_2$— | Oily substance |

Of these compounds particularly preferable are bis(ε-guanidinocaproyl) hexamethylene diamide(I-2), bis(ε-guanidinocaproyl) dodecamethylene diamide(I-3), etc.

The diamide derivative of the invention may be prepared by various methods, but it is preferable to produce it by reducing an ω-nitroguanidino acid diamide derivative having the formula (II) below with hydrogen gas, the reaction being shown in the following eqation:

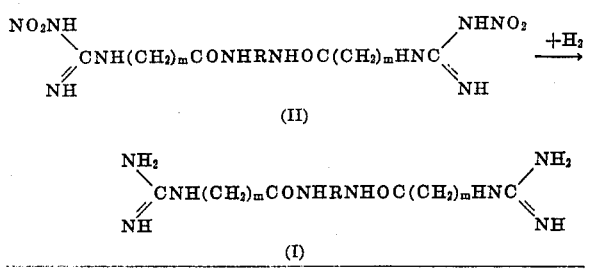

wherein R and $m$ are the same as defined before. This reaction may be conducted in various manners, for example, by introducing hydrogen gas into a solvent solution of the compound (II). Preferable solvents for the purpose are formic acid, acetic acid, propionic acid, a mixture of methanol and hydrochloric acid, etc. and by the use of such as a acid solvent the present diamide derivatives can be obtained in the form of onium salts which are more excellent in stability and water-solubility than the diamides themselves. The temperature of the reduction may be in the range of a room temperature to a boiling point of the solvents used, but preferably it is performed at a moderately elevated temperature of about 60 to 100°C. To accelerate the reaction conventional reducing catalysts such as palladium black, palladium charcoal, etc. may be used.

The compound (II) used as a starting material in the above reaction is an oily or crystalline novel substance insoluble in water and examples thereof are listed in the following Table 2 below:

TABLE 2

NO$_2$NH\\CNH(CH$_2$)$_m$CONHRNHOC(CH$_2$)$_m$CNH/NHNO$_2$
NH                                                              NH

| No. | —(CH$_2$)$_m$— | R | melting point (°C) |
|---|---|---|---|
| II-1 | —(CH$_2$)$_5$— | —(CH$_2$)$_2$— | 230–231 |
| II-2 | —(CH$_2$)$_5$— | —(CH$_2$)$_6$— | 170–174 |
| II-3 | —(CH$_2$)$_5$— | —(CH$_2$)$_{12}$— | 167–169 |
| II-4 | —(CH$_2$)$_5$— | —H$_2$C—⌬—CH$_2$— | 157–162 |

The compound (II) above can preferably be prepared by the following methods (A) to (C), using ε-nitro-guanidino acid (III) as a starting material, though it may also be produced by other methods.

METHOD (A)

The reactions involved in this method are represented as follows:

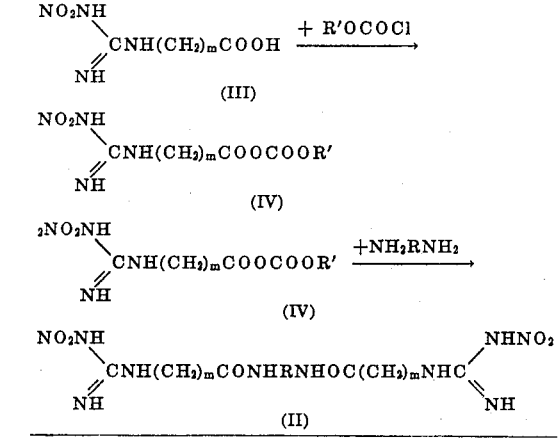

wherein R and m are the same as defined before, and R' is a lower alkyl of one to four carbon atoms.

The starting ω-nitroguanidino acids (III) are known in the art and may be easily prepared by nitrating ω-guanidino acid with fuming nitric acid at a temperature of −10 to +10 °C. The fuming nitric acid may preferably be used in admixture with one or both of fuming sulfuric acid and concentrated nitric acid. Ammonium nitrate dissolved in sulfuric acid may also be used as a nitrating agent. Alternatively the ω-nitioguanidino acid can be prepared by the reaction of ω-amino acid with 2-methyl-1-nitro isourea in an alkali solution. This method is known in the art and described in detail in the appended Example 5. By the introduction of a nitro group to ω-guanidio acid the guanidino group in the resultant ω-nitroguanidino acid is rendered stable in the subsequent chemical reactions, thus enabling the production of the desired ω-nitroguanidino acid diamide derivatives (II) in a high order of yield with the minimum production of byproducts.

The reaction of ω-nitroguanidino acid (III) with a lower alkylchlorocarbonate to produce mixed anhydride (IV) may be carried out in the presence of a solvent, such as N.N-dimethyl formamide, toluene, chloroform, etc. at a temperature of −10 to +10 °C, preferably −5 to 0 °C. Preferable alkylchlorocarbonates are ethylchlorocarbonate, isobutylchlorocarbonate. To accelerate the reaction a dehydrochlorinating agent, such as triethyl amine, tri-n-butyl amine and like tertiary bases may be added to the reaction system. The resultant mixed anhydride (IV) is then subjected to the subsequent reaction with a primary diamine to produce an ω-nitroguanidino acid diamide (II). Various diamines may be used, but primary amines having 5 to 12 carbon atoms are preferable. The reaction may be carried out at a temperature of −10 to +10 °C, preferably −5 to 0°C. The resultant ω-nitroguanidino acid amide (II) may easily be separated from the reaction mixture by adding water thereto.

METHOD (B)

In this method the following reactions are involved:

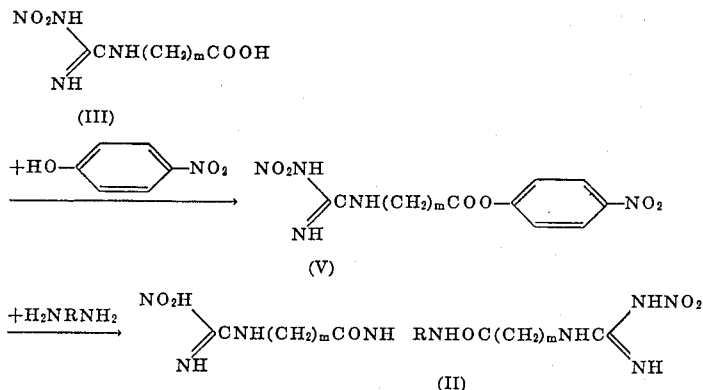

wherein R and m are the same as defined before.

According to this method ω-nitroguanidino acid (III) is reacted with p-nitrophenol to produce p-nitrophenyl ester of ω-nitroguanidino acid (V). This reaction may preferably be carried out in an inert solvent such as N,N-dimethyl formamide in the presence of dehydrating agent, such as hexylcarbodiimide. The reaction temperature may usually be a room temperature. In the place of p-nitrophenol may be used di-p-nitrophenyl sulfite, tri-p-nitrophenyl phosphite, etc, and in this case the reaction is conducted in a solvent such as pyridine or a mixture of pyridine and ethylacetate at a room temperature or moderately elevated temperature of 50 to 60 °C.

The resultant ester (V) is then reacted with a primary diamine to produce the desired compound (II). This reaction may be carried out in the presence of solvents, such as chloroform, methyl acetate, N,N-dimethyl formamide, etc. The reaction temperature may usually be a room temperature.

METHOD (C)

This method involves the following steps of the reaction:

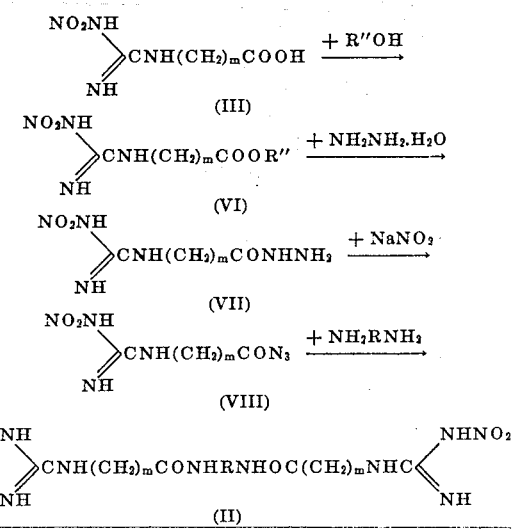

wherein R and m are the same as defined before, and R'' is a lower alkyl of one to four carbon atoms.

The esterification reaction to produce ester (VI) may be carried out by conventional methods. For example, ω-nitroguamidino acid (III) is reacted with a lower alcohol cooled with ice water while introducing dry hydrochloric acid gas. The reaction may also be conducted by refluxing a lower alcohol in the presence of p-toluene sulfonic acid, benzene sulfonic acid, etc. To the resultant ester (VI) is added excess amount of hydrazine and the mixture is left standing at a room temperature or moderately elevated temperature of 50 to 80 °C to produce ω-nitroguanidino acid hydrazide (VII). The hydrazide (VII) is dissolved in hydrochloric acid, acetic acid or like acid and cooled to lower than 0 °C, to which sodium nitrite is added, whereby azide (VIII) can be obtained. The resultant azide is reacted with a diamine at −10 to +5 °C to produce ω-nitroguamidino acid amide derivative (II).

For better understanding of the invention examples of preparing the present diamne derivatives and pharmacological activities thereof are shown below.

EXAMPLE 1

100 ml of fuming nitric acid was added with stirring to a solution of 60 ml of fuming sulfuric acid and 40 ml of concentrated sulfuric acid cooled with ice. While the temperature of the resultant liquid was maintained at lower than 10 °C, 65.7 g of ε-guanidinocaproic acid was added stepwise thereto. After completion of the addition the solution was further stirred continuously for 2 hrs in the ice bath. The resultant reaction solution was poured into 1 kg of ice with stirring, and the precipitated crystals were filtered and washed with water. By recrystallization from hot water 64.8 g of white needle-like crystals of ε-nitroguanidinocaproic acid, melting at 156.5 to 158 °C, was obtained. The yield was 78.2 %. Elementary analysis thereof gave the following results:

|  | C | H | N |
|---|---|---|---|
| Calcd($C_7H_{14}O_4N_4$): | 38.53% | 6.47% | 25.68% |
| Found: | 38.72% | 6.24% | 26.00% |

9.6 g of ε-nitroguanidinocaproic acid thus obtained and 4.5 g of triethylamine were dissolved in 50 ml of N,N-dimethylformamide. To the solution was added dropwise with stirring 4.8 g of ethyl-chlorocarbonate at 0 to −5 °C. After the addition the mixture was further stirred for 15 min. To the resultant mixture was added dropwise with stirring at 0 to −5 °C, 4.0 g of 1,12-dodecamethylene diamine dissolved in 100 ml of chloroform, after which stirring was continued for one hour at the temperature and the mixture was left standing at room temperature overnight to precipitate the crystals. The precipitated crystals were filtered and washed with water. Recrystallization from N,N-dimethylformamide gave 9.6 g of white crystals of 1,12-bis-(ε-nitroguanidinocaproyl) dodcamethylene diamide. The yield was 79.9 %. This product has a melting point of 167 to 169 °C and elementary analysis thereof gave the following results:

|  | C | H | N |
|---|---|---|---|
| Calcd($C_{26}H_{52}N_{10}O_6$): | 51.98% | 8.72% | 23.31% |
| Found: | 51.58% | 9.00% | 23.14% |

3 g of 1,12-bis-(ε-nitroguanidinocaproyl) dodecamethylene diamide thus obtained was dissolved in 50 ml of glacial acetic acid and palladium black was added to the solution. Then hydrogen gas was introduced to the mixture at 70 to 80 °C for 8 hrs. and further passed therethrough at room temperature for 9 hrs. Palladium black was then removed by filtration and the mixture was concentrated under reduced pressure. Recrystallatization from ethanol-ether gave 2.9 g of white powdery crystals of 1,12-bis-(ε-guanidinocaproyl) dodecamethylene diamide diacetate having a melting point of 123 to 125 °C. The yield 91.9 %.

Sakaguchi reaction of the product was positive and elementary analysis thereof gave the following results:

|  | C | H | N |
|---|---|---|---|
| Calcd($C_{26}H_{54}O_2N_8$·2$CH_3COOH$): | 57.12% | 9.91% | 17.76% |
| Found: | 56.79% | 10.11% | 18.01% |

The pharmacological activity of the compound was tested and the following results were obtained:

1. Antagonistic action on bradykinin a. Depressive action on contraction of smooth muscle Through the test for the depressive effect of the compound on the contration of isolated uterus muscle of rats by bradykinin, the compound exhibited a marked depressive action at a concentration of $10^{-5}$ mol/lit.

The depressive action of the compound is by far stronger than various substances which have been recognized as having anti-bradykinin action.

b. Depressive action on vascular permeability

The depressive action of the compound on the acceleration of vascular permeability in the case of subcutaneous administration of bradykinin to rabbits, rats, mice, etc. was tested and a marked depressive action was exhibited by the dose of 10 mg/kg.

2. Depressive action on edema

The depressive action of the compound on the increase of edema with the passage of time when carrageenin was administered through the heel of rats was tested, and by administration of a dose of 10 mg/kg, the edema was markedly depressed.

EXAMPLE 2

24.0 g of ε-nitroguanidinocaproic acid and 11.1 g of triethylamine were dissolved in 120 ml of N,N-dimethylformamide. To the solution cooled to 0 to −5 °C was added dropwise 11.9 g of ethylchloro-carbonate with stirring, after which the mixture was further stirred for 15 min. To the resultant reaction mixture was dropwise added slowly at 0 to −5 °C 5.8 g of 1.6-hexamethylenediamine dissolved in a mixed solvent of 60 ml of N,N-dimethylformamide and 60 ml of chloroform, and further stirred at the temperature for one hour, and left standing at room temperature over-night. The reaction mixture was poured into water with stirring and the precipitated crystals were filtered. Recrystallization from N,N-dimethylformamide gave 16.8 g of white crystals of 1,6-bis(ε-nitroguanidinocaproyl) hexamethylene diamide having a melting point of 170 − 174 °C. The yield was 65.1 % and elementary analysis thereof gave the following results:

|  | C | H | N |
|---|---|---|---|
| Calcd($C_{20}H_{40}N_{10}O_6$): | 46.50% | 7.80% | 27.11% |
| Found: | 46.74% | 8.01% | 27.42% |

5.2 g of 1.6-bis(ε-nitroguanidinocaproyl) hexamethylene diamide was dissolved in 100 ml of glacial acetic acid and palladium black was added to the solution. Hydrogen gas was introduced to the mixture at 70 to 80 °C for 15 hrs, and then palladium black was removed by filtration. The mixture was concentrated under reduced pressure and by recrystallization from ethanol-ether 4.2 g of white powdery crystals of 1.6-bis(ε-guanidinocaproyl)hexamethylene diamide diacetate, melting at 101 − 115 °C was obtained. The yield was 76 %. The compound showed positive in Sakaguchi reaction and elementary analysis thereof gave the following results:

|  | C | H | N |
|---|---|---|---|
| Calcd($C_{20}H_{42}N_8O_2$·2$CH_3COOH$): | 52.73% | 9.22% | 20.50% |
| Found: | 52.41% | 9.48% | 20.73% |

The depressive action of the compound on the contraction of isolated uterus muscle of rats by bradykinin was tested, and the compound exhibited a marked depressive action at a concentration of $10^{-4}$ mol/lit.

EXAMPLE 3

14.2 g of ε-nitroguanidinocapric acid and 5.6 g of triethylamine were dissolved in 60 ml of N,N-dimethylformamide. To the solution cooled to 0 to −5°C 6 g of ethylchlorocarbonate was added dropwise with stirring, after which the stirring was continued for 15 min. To the mixture was dropwise added slowly 1.8 g of ethylene diamine dissolved in 30 ml of N,N-dimethylformamide, and after further stirring at the temperature for 1 hour the solution was left standing overnight. The resultant reaction mixture was poured into water with stirring, and the precipitated crystals were filtered. Recrystallization from N,N-dimethylformamide-ether gave 10 g of white powdery crystals of bis(ε-nitroguanidinocaproyl) ethylenediamide having a melting point of 230 − 231°C. The yield was 76.2 %. The elementary analysis thereof gave the following results:

|  | C | H | N |
|---|---|---|---|
| Calcd($C_{10}H_{32}N_{10}O_6$): | 41.73% | 7.00% | 30.43% |
| Found: | 42.00% | 7.27% | 30.68% |

3.3 g of bis($\epsilon$-nitroguanidinocaproyl)ethylenediamide was suspended in 200 ml of glacial acetic acid, and palladium black was added to the solution. Hydrogen gas was introduced to the mixture at 70 – 80°C for 20 hrs. Thereafter the palladium black was removed by filtration, and the mixture was concentrated under reduced pressure. By recrystallization from methanolether, 2.4 g of white powdery crystals of bis($\epsilon$-guanidinocaproyl)ethlenediamine diacetate, melting at 215 – 218°C was obtained. The yield was 68.6 %. The Sakaguchi reaction of the compound was positive and elementary analsis thereof gave the following results:

|  | C | H | N |
|---|---|---|---|
| Calcd($C_{16}H_{34}N_8O_2$.<br>2$CH_3COOH$): | 48.96% | 8.63% | 22.84% |
| Found: | 48.85% | 8.75% | 23.08% |

The depressive effect of the compound on the contraction of isolated uterus muscle of rats by bradykinin was tested, and marked depressive action was exhibited at a concentration of $10^{-3}$mol/lit.

EXAMPLE 4

14.4 g of $\epsilon$-nitroguanidinocaproic acid and 6.7 g of triethylamine were dissolved in 50 ml of N,N-dimethylformamide. To the solution cooled to 0 to −5°C 7.2 g of ethyl chlorocarbonate was dropwise added with stirring, after which further stirred for 15 min. To the mixture was dropwise added slowly 4.1 g of m-xylylenediamine dissolved in 25 ml of N,N-dimethylformamide, and after being stirred at the temperature for 1 hour the mixture was left standing overnight. The reaction mixture was poured into water with stirring and the precipitated crystals were filtered and recrystallized from dimethylformamide, whereby 10.5 g of 1,3-bis($\epsilon$-nitroguanidinocaproyl)xylylenediamide, melting at 157 – 162°C was obtained. The yield rate of 66 %. The elementary analysis gave the following results:

|  | C | H | N |
|---|---|---|---|
| Calcd($C_{22}H_{36}N_{10}O_6$): | 49.24% | 6.76% | 26.10% |
| Found: | 49.55% | 6.95% | 26.29% |

5.4 g of 1,3-bis($\epsilon$-nitroguanidinocaproyl)xylylene diamide was dissolved in 70 ml of glacial acetic acid, and palladium black was added thereto. The mixture was then reduced at 70 – 80°C for 15 hrs. by introducing hydrogen gas, then palladium black was removed by filtration, and concentrated under reduced pressure. The resultant oily substance was thoroughly washed with ethanol-ether, whereby slightly yellowish transparent tacky and oily substance, 1,3-bis($\epsilon$-guanidinocaproyl)xylylene diamide was obtained.

This compound showed positive in Sakaguchi reaction and exhibited a marked depressive action at a concentration of $10^{-3}$mol/lit on the contraction of isolated uterus muscle of rats by bradykinin.

EXAMPLE 5

5.4 g of $\epsilon$-aminocaproic acid was dissolved in a mixture of 40 ml of water and 20 ml of 2N-sodium hydroxide, and under cooling 4.8 g of 2-methyl-1-nitroisourea was slowly added thereto. After 2 hour' stirring, the mixture was acidified with hydrochloric acid to precipitate crystals. The precipitated crystals were filtered and recrystallized from hot water, whereby 3.8 g of white needle-like $\epsilon$-nitro-guanidinocaproic acid, melting at 156–158°C, was obtained:

|  | C | H | N |
|---|---|---|---|
| Calcd($C_7H_{14}O_4N_4$): | 38.53% | 6.47% | 25.68% |
| Found: | 38.23% | 6.42% | 25.78% |

$\epsilon$-nitroguanidinocaproic acid was also prepared by the following method:

In 20 ml of concentrated sulfuric acid cooled to less than 10°C was dissolved 8.7g of $\epsilon$-guanidinocaproic acid. To the solution was added 5.2 g of ammonium nitrate with stirring and the stirring was continued for 2 hrs. The mixture was thereafter poured into ice water to precipitate crystals. The precipitated crystals were recrystallized from hot water, whereby 6.5 g of white needle-like $\epsilon$-nitroguanidinocaproic acid, melting at 156–158°C, was obtained.

|  | C | H | N |
|---|---|---|---|
| Calcd($C_7H_{14}O_4N_4$): | 38.53% | 6.47% | 25.68% |
| Found: | 38.59% | 6.52% | 25.84% |

4.3 g of $\epsilon$-nitroguanidinocaproic acid thus obtained and 3.1 g of p-nitrophenol were dissolved in 30 ml of N,N-dimethylformamide, and under cooling 4.4 g of dicyclohexylcarbodiimide was added thereto, and after stirring for 3 hrs. the precipitated substance was removed by filtration. To the filtrate water was added to precipitate the crystals. By recrystallization from N,N-dimethylformamide-water 2.9 g of yellow powdery p-nitrophenyl ester of $\epsilon$-nitro-guanidinocaproic acid having a melting point of 111 – 112.5°C was obtained. Elementary analysis thereof gave the following results:

|  | C | H | N |
|---|---|---|---|
| Calcd($C_{13}H_{17}O_6N_5$): | 46.03% | 5.05% | 20.65% |
| Found: | 45.72% | 5.17% | 20.48% |

8 g of p-nitrophenyl ester of $\epsilon$-nitroguanidinocaproic acid and 3 g of 1,12-dodecamethylenediamine were dissolved in 40 ml of N,N-dimethylformamide, and left standing overnight at room temperature. After the reaction water was added thereto to precipitate the crystals. By recrystallization of the crystals from N,N-dimethylformamide-water 5.4 g of white powdery 1,12-bis($\epsilon$-nitroguanidinocaproyl)dodecamethylenediamide, melting at 167 – 169°C, was obtained. Elementary analysis thereof gave the following results:

|  | C | H | N |
|---|---|---|---|
| Calcd($C_{26}H_{52}N_{10}O_6$): | 51.98% | 8.72% | 23.31% |
| Found: | 52.01% | 8.46% | 23.37% |

In the similar method as in Example 1 1,12-bis($\epsilon$-nitroguanidinocaproyl)dodecamethylenediamide was reduced, whereby 3.4 g of white powdery 1,12-bis($\epsilon$-guanidinocaproyl)dodecamethylenediamide diacetate, melting at 123 – 125°C, was obtained. Elementary analysis thereof gave the following results:

|  | C | H | N |
|---|---|---|---|
| Calcd($C_{26}H_{54}O_2N_8$.<br>2$CH_3COOH$): | 57.12% | 9.91% | 17.76% |
| Found: | 56.83% | 10.02% | 17.49% |

At the concentration of $10^{-5}$mol/lit, the resultant compound exhibited depressive action on the contraction of isolated uterus muscle rats by bradykinin. Also notable depressive action was exhibited on the acceleration of vascular permeability in intracutaneous administration of histamine to guinea-pig with a dose of 10 mg/kg (intra peritoneal administration).

EXAMPLE 6

In 80 ml of N,N-dimethyl formamide were dissolved 24.3 g of ε-nitroguanidinocaproic acid p-nitrophenyl ester obtained in the same manner as in Example 5 and 1.8 g of ethylene diamine and the solution was left standing overnight at room temperature. Water was thereafter added to the resultant reaction mixture to precipitate crystals. Recrystallization of the precipitated crystals from N,N-dimethylformamide-ether gave 14.2 g of white powdery bis(ε-nitroguanidinocaproyl)ethylenediamide having a melting point of 230 – 231°C. Elementary analysis thereof gave the following results:

|  | C | H | N |
|---|---|---|---|
| Calcd($C_{16}H_{32}N_{10}O_6$): | 41.73% | 7.00% | 30.43% |
| Found: | 41.57% | 7.18% | 30.72% |

4.6 g of bis(ε-nitroguanidinocaproyl)ethylenediamide was suspended in 200 ml of glacial acetic acid, to which was added palladium black. Hydrogen gas was introduced to the mixture at 70 – 80°C for 20 hrs, and palladium black was then removed by filtration. The filtrate was concentrated under reduced pressure, and by recrystallization from methanol-ether, 3.2 g of white powdery bis(ε-guanidinocaproyl)ethylenediamide diacetate, melting at 215 – 218°C, was obtained. Elementary analysis thereof gave the following results:

|  | C | H | N |
|---|---|---|---|
| Calcd($C_6H_{34}N_8O_2$·2$CH_3COOH$): | 48.96% | 8.63% | 22.84% |
| Found: | 48.65% | 8.87% | 23.08% |

By the test of the compound in the manner similar to that of Example 1, depressive action was observed on bradykinin at the concentration of $10^{-3}$ mol/lit.

EXAMPLE 7

21.8 g of ε-nitroguanidinocaproic acid was suspended in 450 ml of methanol, and the suspension was stirred under cooling, while introducing hydrogen chloride gas until the acid was thoroughly dissolved. After the reaction the mixture was concentrated under reduced pressure, and water was added to the residue to precipitate the crystals. By recrystallization from methanol-ether 11 g of white needle-like ε-nitroguanidinocaproic acid methyl ester, melting at 99 – 100°C was obtained. Elementary analysis thereof gave the following results:

|  | C | H | N |
|---|---|---|---|
| Calcd($C_8H_{18}N_4O_4$): | 41.37% | 6.94% | 24.12% |
| Found: | 41.33% | 7.19% | 24.30% |

8.1 g of ε-nitroguanidinocaproic acid methyl ester was dissolved in 60 ml of methanol. To the solution was added 4.3 g of 80% hydrazine hydrate and left standing at room temperature for 40 hrs. Ether was thereafter added to the reaction mixture to precipitate crystals. By recrystallization from ethanol-ether 4.1 g of white ε-nitroguanidinocaproylhydrazide, melting at 141 to 145°C was obtained. Elementary analysis thereof gave the following results:

|  | C | H | N |
|---|---|---|---|
| Calcd($C_7H_{16}N_6O_3$): | 36.20% | 6.94% | 36.19% |
| Found: | 36.60% | 7.24% | 35.90% |

5.5 g of ε-nitroguanidinocaproylhydrazide was dissolved in 60 ml of 1N-hydrochloric acid, and under cooling 29 ml of 1N sodium nitrite was added thereto. The separated product was extracted with ethyl acetate, and to the ethyl acetate layer was added under cooling 1.2 g of 1,6-hexamethylenediamine dissolved in 10 ml of ether. After being stirred for two hrs the mixture was left standing overnight. Then ether was added thereto to precipitate crystals and the precipitated crystals were filtered and recrystallized from N,N-dimethylformamide-ether, whereby 3.1 g of white 1,6-bis(ε-nitroguanidinocaproyl)hexamethylenediamide, melting at 170 – 174°C, was obtained. Elementary analysis thereof gave the following results:

|  | C | H | N |
|---|---|---|---|
| Calcd($C_{20}H_{40}N_{10}O_6$): | 46.50% | 7.80% | 27.11% |
| Found: | 46.72% | 7.69% | 27.46% |

In the same method as in Example 2 1,6-bis(ε-nitroguanidinocaproil)hexamethylenediamine was reduced, whereby 19.8 g of white powdery bis(ε-guanidinocaproyl) hexamethylene diamide diacetate, melting at 101–115°C, was obtained. Elementary analysis thereof gave the following results:

|  | C | H | N |
|---|---|---|---|
| Calcd($C_{20}H_{42}N_8O_2$·2$CH_3COOH$): | 52.73% | 9.22% | 20.50% |
| Found: | 52.38% | 9.37% | 20.82% |

The resultant compound was tested in the manner similar to that of Example 3 and exhibited depressive action on bradykinin, at the concentration of $10^{-4}$ mol/lit.

EXAMPLE 8

5.5 g of ε-nitroguanidinocaproylhydrazide obtained in the same manner as in Exampel 7 was dissolved in 60 ml of 1N-hydrochloric acid, and the undercooling 29 ml of 1N sodium nitrite was added thereto. The separated product was extracted with ethyl acetate, and to the ethyl acetate layer was added 1.4 g of m-xylylenediamine dissolved in 10 ml of ether under cooling. After being stirred for two hours the mixture was left standing overnight. Then ether was added thereto to precipitate crystals. The precipitated crystals were filtered and recrystallized from N,N-dimethylformamide-water, whereby 27.8 g of 1,3-bis(ε-nitroguanidecaproyl)xylylenediamide, melting at 157 to 162°C, was obtained. Elementary analysis thereof gave the following results:

|  | C | H | N |
|---|---|---|---|
| Calcd($C_{22}H_{36}N_{10}O_6$): | 49.24% | 6.76% | 26.10% |
| Found: | 49.09% | 6.97% | 26.32% |

In the same manner as in Example 4, 1,3-bis(ε-nitroguanidinocaproyl)xylylenediamide was reduced with hydrogen gas whereby 1.4 g of 1,3-bis(ε-guanidinocaproyl)xylylenediamide diacetate was obtained as a light yellow transparent tacky and oily substance.

The depressive action of the compound on bradykinin was exhibited at the concentration of $10^{-3}$ mol/lit in the test similar to that of Example 3.

What we claim is:
1. An ω-guanidino acid diamide derivative having the formula

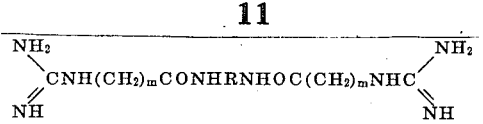

wherein $m$ is an integer of 1 to 10 and R is an alkylene of one to 12 carbon atoms or

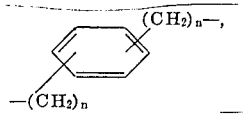

$n$ being 0 or an integer of 1 to 3.

2. The ω-guanidino acid diamide derivative according to claim 1, in which said R is an alkylene of one to 12 carbon atoms.

3. The ω-guanidino acid diamide derivative according to claim 1, in which said R is

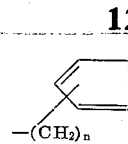

$n$ being 0 or an integer of 1 to 3.

4. The ω-guanidino acid diamide derivative according to claim 1, in which said $m$ is an integer of 5.

5. The ω-guanidino acid diamide derivative according to claim 1, in which said $m$ is an integer of 5 and R is ethylene.

6. The ω-guanidino acid diamide derivative according to claim 1, in which said $m$ is an integer of 5 and R is hexamethylene.

7. The ω-guanidino acid diamide derivative according to claim 1, in which said $m$ is an integer of 5 and R is dodecamethylene.

8. The ω-guanidino acid diamide derivative according to claim 1, in which said $m$ is an integer of 5 and R is xylylene.

* * * * *